United States Patent [19]

Bodlaj

[11] Patent Number: 4,464,053

[45] Date of Patent: Aug. 7, 1984

[54] METHOD FOR CORRECTING A MEASURING SIGNAL

[75] Inventor: Viktor Bodlaj, Munich, Fed. Rep. of Germany

[73] Assignee: Siemens Aktiengesellschaft, Berlin & Munich, Fed. Rep. of Germany

[21] Appl. No.: 291,017

[22] Filed: Aug. 7, 1981

[30] Foreign Application Priority Data

Sep. 30, 1980 [DE] Fed. Rep. of Germany ....... 3036886

[51] Int. Cl.$^3$ .......................... G01B 11/00; G01D 3/02
[52] U.S. Cl. ......................................... 356/376; 356/1
[58] Field of Search ................ 356/1, 4, 376

[56] References Cited

U.S. PATENT DOCUMENTS

| | | | |
|---|---|---|---|
| 3,796,492 | 3/1974 | Cullen et al. | 356/4 |
| 3,885,875 | 5/1975 | Rosenfeld et al. | 356/120 |
| 3,923,395 | 12/1975 | Bodlaj | 356/1 |
| 4,004,239 | 1/1977 | Clarke | 329/109 |
| 4,005,281 | 1/1977 | Faulhaber et al. | 238/151.3 |
| 4,053,227 | 10/1977 | Bodlaj | 356/1 |

FOREIGN PATENT DOCUMENTS 1773635 11/1971 Fed. Rep. of Germany .
2727926 1/1979 Fed. Rep. of Germany .

Primary Examiner—R. A. Rosenberger
Attorney, Agent, or Firm—Hill, Van Santen, Steadman & Simpson

[57] ABSTRACT

A method for correcting a measuring signal which has been generated by an apparatus measuring in contact-free fashion. The apparatus scans a surface to be measured with a light beam, measures the light reflected by the surface by means of an opto-electric detector installation, and generates the measuring signal in dependence upon one or more electrical signals emitted by the detector. In the case of the above-described apparatus, distortions of the electrical signal emitted by the detector, which distortions occur for example through non-uniform scattering ability of the surface to be measured, can result. These distortions lead to measurement errors. Such measurement errors are corrected in the simplest manner possible. For this purpose, the measuring signal is corrected in dependence upon a distortion of an electrical signal.

10 Claims, 7 Drawing Figures

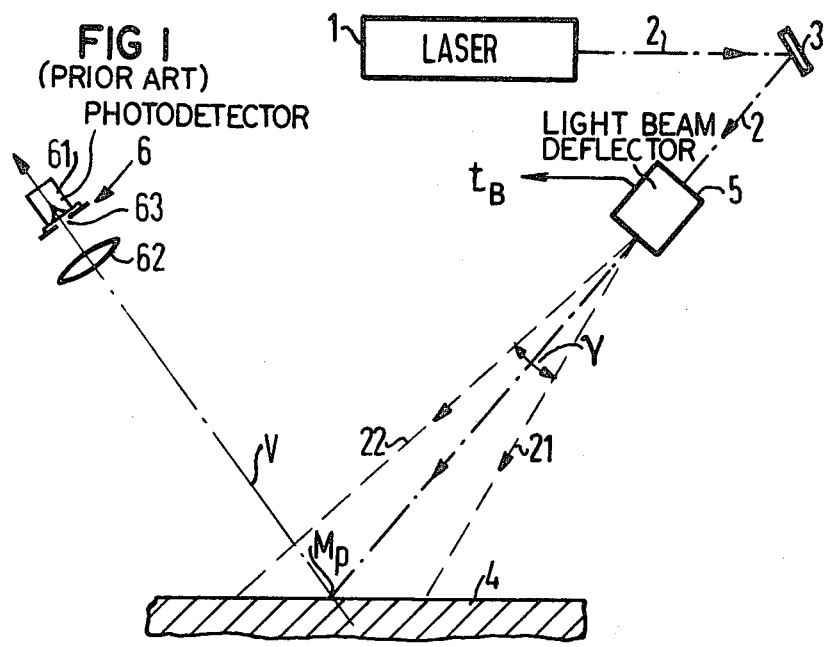
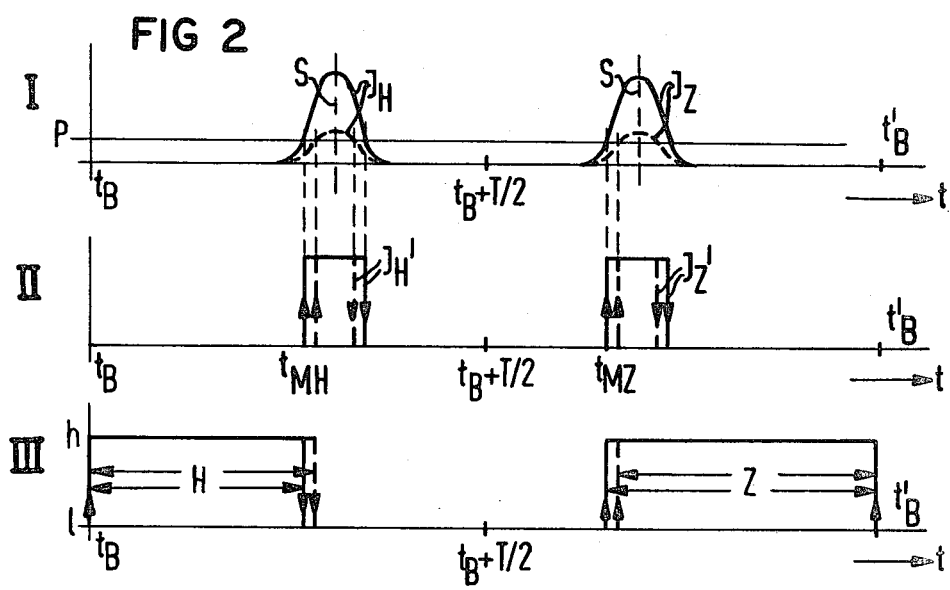

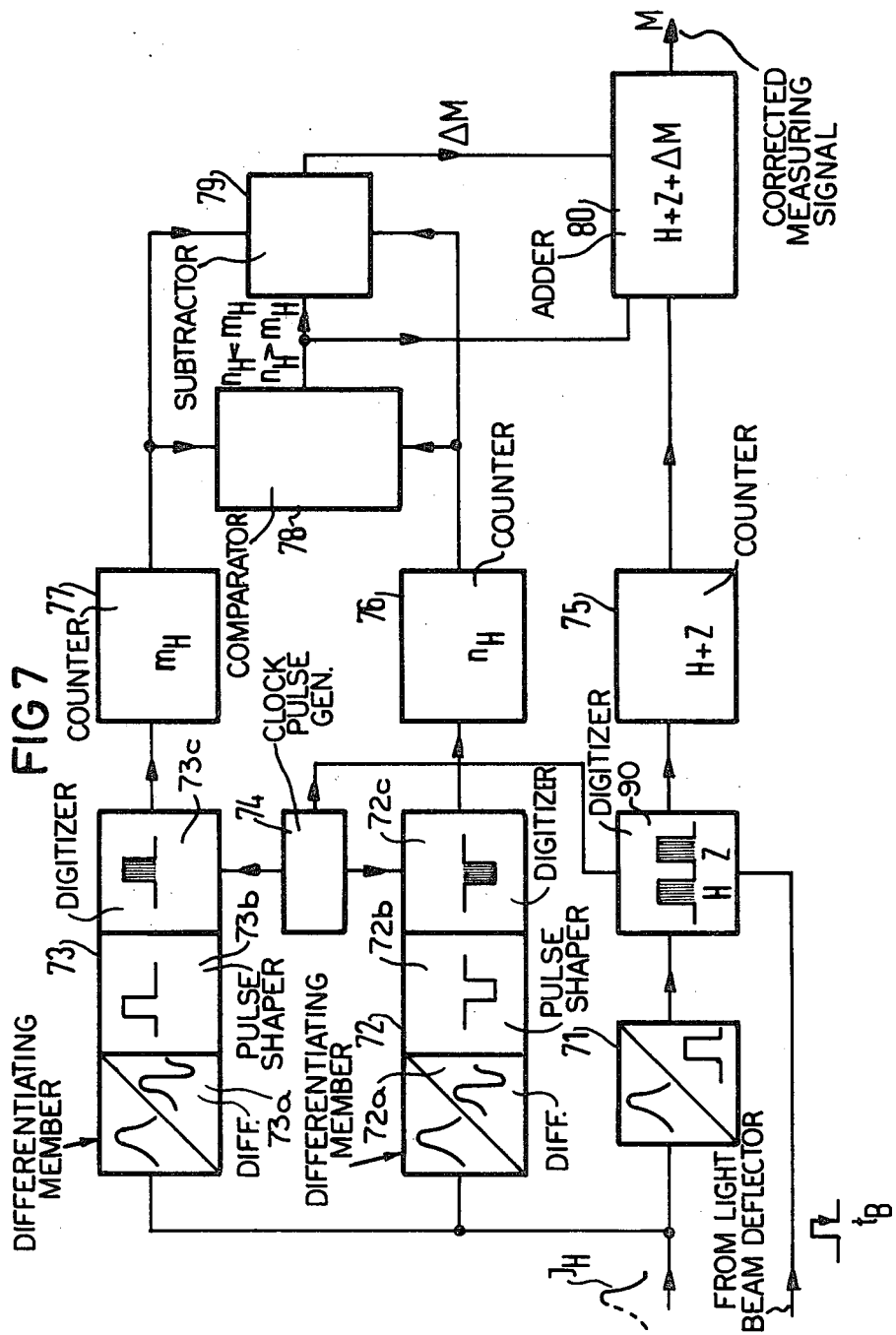

METHOD FOR CORRECTING A MEASURING SIGNAL

BACKGROUND OF THE INVENTION

The present invention relates to a method for correcting a measuring signal generated by an apparatus which measures in contact-free fashion by scanning a surface to be measured with a light beam and detecting light reflected from the surface with an opto-electronic detector. Typically, as the light beam crosses a point on the surface determined by a sighting line along which the opto-electronic sights, a pulse is created. When the beam reverses, a second pulse is created.

German Nos. OS1773635 and OS2533906 corresponding to U.S. Pat. No. 3,885,875, both incorporated herein by reference, show optical measuring systems wherein a reflected signal is received by an opto-electronic detector.

Given a known apparatus of the type above cited, a strongly concentrated light beam, preferably a laser beam moved back and forth in a plane, scans a surface of an object. An opto-electronic detector installation with a strongly concentrated receiving characteristic along a sighting line is so arranged that the sighting line is disposed in a plane and strikes the surface of the object at a location which is also struck by the strongly concentrated light beam being moved back and forth. The detector installation thus essentially receives only light which is scattered from the surface in the direction of the sighting line, and also only when the strongly conccetrated light beam strikes the location.

The detector installation measures the overall intensity of the received light. The resulting measuring signal results from the convolution of the intensity distribution provided at the impact spot of the strongly conventrated light beam on the surface of the object with the diaphragm or slit function of the detector installation over time. Graphically this means that the light spot radiating in the direction of the sighting line, and existing light at the place of incidence of the light beam on the surface of the object, travels over time into the diaphragm aperture, so that increasingly more light passes through the diaphragm aperture until a maximum value is attained. Then the light spot over time again travels out of the diaphragm aperture. If the local intensity in this light spot is constant during the travelling-through time, then the detector installation emits a signal which under certain conditions exhibits a symmetrical chronological progression in the form of a bell shaped function. For example, this is the case if the diaphragm aperture is a rectangular slit which is swept perpendicularly to the longitudinal direction of the slit by a circular light spot of equal intensity everywhere.

Given the known installation, the measurement is based on the stated chronologically symmetrical progression of the measuring signal supplied by the detector installation.

If, therefore, the chronologically symmetrical progression of the electrical signal supplied by the detector installation is no longer provided, measuring errors occur with this installation. The chronologically symmetrical progression of the electrical signal is, for example, no longer guaranteed when the intensity of the light scattered by the surface of the object locally varies.

SUMMARY OF THE INVENTION

It is an object of the present invention to create a method which permits correction in the simplest fashion of a measuring error based on a distortion of the electrical signal emitted by the detector installation.

This object is achieved by forming the measuring signal in dependence upon electrical signals emitted by the detector of the measuring signal apparatus system, the measuring signal being corrected for a symmetrical shaped distortion in at least one of the electrical signals from the detector.

This surprisingly simple solution offers a series of considerable advantages.

The correction of the measuring signal can proceed purely electronically, and the installation for the contact-free measurement itself need not be altered. Since the error correction has been transferred solely to the electronics, all advantages of electronic arithmetic apparatus, in particular the achievements of integrated micro-electronics such as are embodied for example by the fully integrated micro-processor modules, can be utilized. The correction can be randomly precisely conducted, if necessary, via complicated approximation methods. Presentday computer speeds permit an extremely rapid correction which hardly impairs the present measurement speeds.

Preferably the measuring signal is corrected with a separately generated correction signal which is dependent upon the distortion of the electrical signal.

It is frequently expedient if the distortion of the electrical signal is ascertained through differentiation of the signal and through comparison of specific existing pulses in the differentiated signal. A preparation of this type of the distorted signal in many instances simplifies, in the case of distortions due to locally dependent scattering behavior, the further electronic processing, and at the same time is also satisfactory for the most frequently made precision requirements.

In the case of a locally dependent scattering ability, in many instances it is frequently sufficient if the distortion is ascertained through comparison of the pulse widths of the specific pulses.

It is sufficient here in particular for locally dependent scattering ability if the correction signal is formed in dependence upon a difference of the pulse width of two specific pulses of the differentiated electrical signal.

In the case of a known contact-free measuring installation of the type initially described, a measuring signal is formed in dependence upon the chronological interval between two successive electrical signals. In particular, it is especially expedient if, for the purpose of correction of the measuring signal, the time difference is corrected by adding the difference of the pulse widths of the two specific pulses of the differentiated electrical signal to this time difference.

BRIEF DESCRIPTION OF THE DRAWINGS

FIG. 1 illustrates, in schematic representation, the known contact-free measuring apparatus;

FIG. 2 illustrates pulse diagrams I–III which illustrate electrical signals emitted by the detector of the apparatus over time t and their processing, whereby it is assumed that the surface of the object to be measured exhibits a uniform scattering ability or power and that the electrical signals are undistorted by it;

FIG. 7 illustrates a block circuit diagram of an electronic circuit with which from distorted signals are corrected measuring signal can be produced.

DESCRIPTION OF THE PREFERRED EMBODIMENTS

Figure 3:
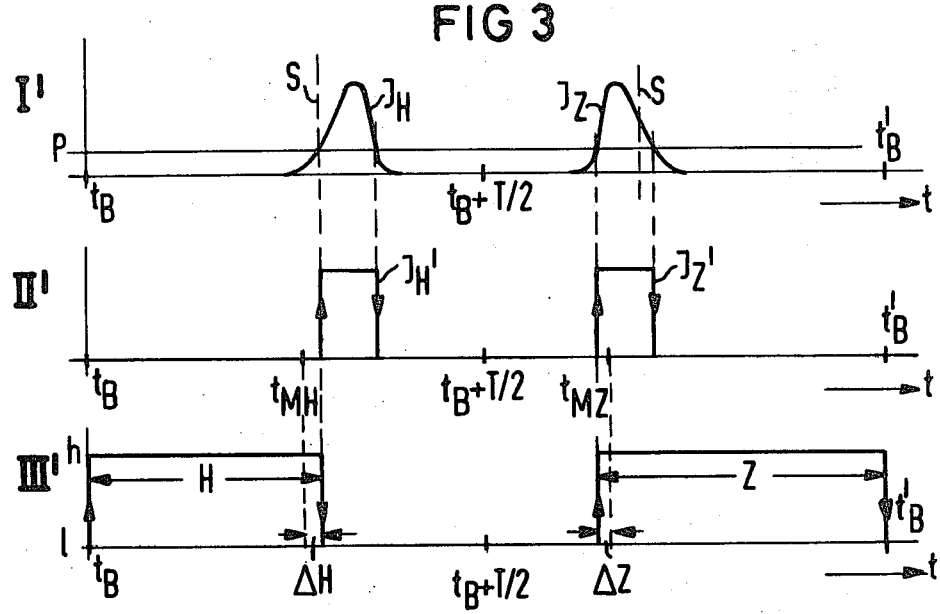
FIGS. 3 and 4 in diagrams I′–III′ and I″–III″ respectively illustrate pulse diagrams similar to those of FIG.

In apparatus illustrated in FIG. 1, from a laser 1 strongly concentrated laser beam 2 is emitted which is deflected by a reflecting mirror 3 in the direction of a surface 4 of an object to be measured. In the beam path of the deflected laser beam 2, a light beam deflector 5 is arranged which moves the laser beam 2 back and forth in the drawing plane between two boundary directions 21 and 22 which include an angle. An opto-electronic detector installation with a strongly concentrated receiving characteristic along a sighting line V is arranged such that the sighting line V likewise runs in the drawing plane and strikes the region of the surface swept over by the deflected laser beam 2. This detector installation is constructed with a photo-detector 61 whose detector window 63 forms a small slit. In front of the detector window there is arranged an imaging optics 62 which images in real fashion the location of the surface 4 pierced by the sighting line V on the plane in which the detector window 63 is disposed.

In the apparatus illustrated in FIG. 1, a specific initial time is periodically measured when the deflected laser beam 2 assumes a specific direction, for example the direction 21. This specific direction corresponds to a specific phase of the periodic deflection operation. From direction 21 the deflected laser beam 2 moves toward the left until it assumes direction 22, reverses there, and again moves toward the right until it has again assumed the direction 21. From here, the described deflection operation begins anew. Each time the deflected laser beam 2 strikes the sighting line V on the surface 4, the photo-detector 61 emits a signal. The period H between initial time $t_B$ and time $t_{MH}$ in which the detector 61 first emits a signal is measured by means of a clock. Then the period Z is measured between time $t_{MZ}$ at which detector 61 emits a signal for a second time in the same time period and the following initial time $t'_B$. From these measured periods, it is possible to determine by way of computation the distance of that particular point where sighting line V pierces surface 4 from a specifiable reference plane. This point is referenced $M_p$.

In FIG. 2 it is shown how, in the case of the apparatus illustrated in FIG. 1, the decisive periods H and Z are determined in a deflection period $t'_B - t_B = T$.

The deflected laser beam 2 at the measured time $t_B$ assumes direction 21 shown in FIG. 1. The light spot produced by this deflected laser beam 2 on surface 4 moves toward the left in FIG. 1 until it reaches the proximity of point $M_p$. This point lies in the slit-shaped detector window imaged by the optics 62 on surface 4. Through the convolution of the intensity distribution at the light spot and the slit function of the detector window, the detector under certain conditions emits an electric signal $J_H$ in the form of a symmetrical bell-shaped curve. As already stated earlier, this is the case for example when the light spot is a circle in which uniform intensity prevails.

The light spot on surface 4, after it has crossed the image of the detector window, travels away form the window until the laser beam 2 points in direction 22. In the apparatus illustrated in FIG. 1, it attains this position at time $t_B + T/2$. From this time on, the light spot again travels back and once again sweeps over the image of the detector window, whereby the detector once again emits a symmetrical bell-shaped electrical signal referenced $J_Z$. For the apparatus under discussion here, the light spot sweeps over the image of the detector window during the approach path as well as the return path in the same time period so that the two bell-shaped curves $J_H$ and $J_Z$ (see diagram I in FIG. 2) exhibit the same pulse width and are also otherwise equal.

The bell-shaped pulses $J_H$ and $J_Z$ are converted with the aid of the threshold element into rectangular pulses of corresponding width. These pulses are apparent from diagram II in FIG. 1 and are referenced $J'_H$ and $J'_Z$ respectively. The width of each of these pulses corresponds to the width of the bell-shaped pulse $J_H$ and $J_Z$, respectively, at the height of the level voltage P illustrated in diagram I.

The rising or leading edge of each pulse $J'_H$ and $J'_Z$ controls a memory element, for example a bistable element by which at commencement time $t_B$ one output has been set from a low voltage 1 to a higher voltage L. The leading edge of pulse element, connected to h back to the voltage 1. If the leading edge of the second pulse $J'_Z$ then appears at time $t_{MZ}$, the output connected to 1 is then again set to h. It remains at this state until time $t'_B$ at which it is reset. These just described conditions are illustrated in diagram III. The length of the pulse between $t_B$ and $t_{MH}$ is the period H, and the length of the pulse between $t_{MZ}$ and $t'_B$ is the period Z.

The instance indicated in broken lines in the diagrams of FIG. 2 shows that the sum $M = H + Z$ is independent of the pulse widths of the bell-shaped pulses $J_H$ and $J_Z$. However, this sum M, in the case of the apparatus under discussion, is the decisive time for the interval determination. The latter is thus independent of the height of the symmetrical bell-shaped pulses $J_H$ and $J_Z$.

However, the sum M no longer remains constant when the bell-shaped pulses $J_H$ and $J_Z$ become unsymmetrical, i.e., distorted. Such unsymmetrical bell-shaped pulses can result, for example, if the intensity distribution in the light spot or the scattering capability of the surface 4 are non-uniform.

Figure 4:
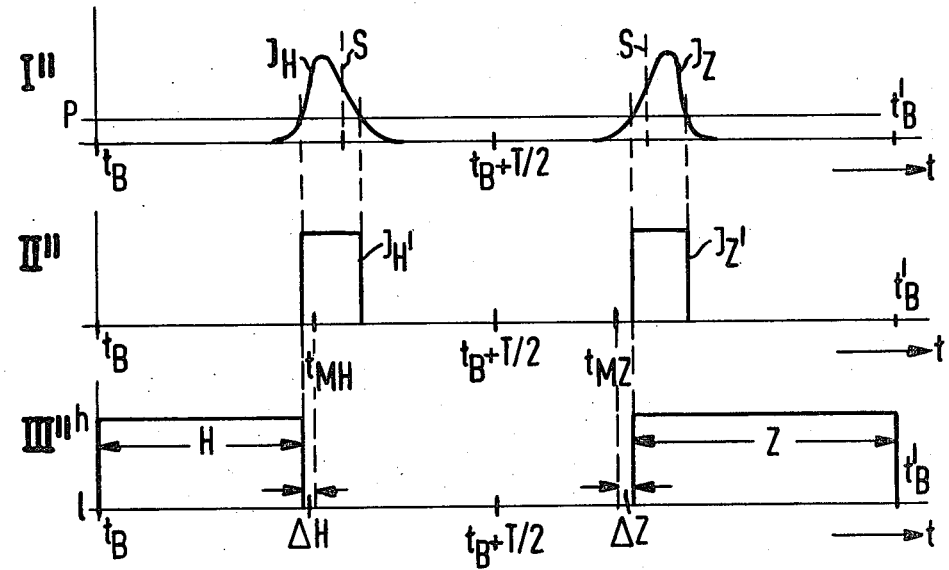

In FIGS. 3 and 4 such unsymmetrical bell-shaped pulses $J_H$ and $J_Z$ are illustrated, namely in diagram I' and I'', respectively. In diagram I' of FIG. 3 it is assumed that the peak of the bell-shaped pulse $J_H$ is shifted toward the right relative to symmetry line S, and in diagram II'' of FIG. 4, it is assumed that the peak of the bell-shaped pulse $J_H$ is shifted from the summetry line S toward the left. Since the deflected light beam 2 (FIG. 1) from time $t_B + T/2$ moves in the opposite direction, the conditions are precisely the opposite in the case of pulses $J_Z$. In diagram I' of FIG. 3, the peak of the bell-shaped pulse $J_Z$ is shifted from the symmetry line S to the left, and in the diagram I'' of FIG. 4, the peak of the bell-shaped pulse $J_Z$ is shifted from the symmetry line S toward the right.

In diagrams II′ and II″ of the FIGS. 3 and 4, respectively, the rectangular pulses J′$_H$ and J′$_Z$ formed on the bell-shaped pulses J$_H$ and J$_Z$ with the aid of the voltage level P, are illustrated. Here it can be seen that the leading edges of these pulses relative to the times t$_{MH}$ and t$_{MZ}$, with reference to the diagram II in FIG. 2 (the times of the leading edges of the rectangular pulses indicated in heavy black lines in FIG. 2 are relevant) are displaced. They are displaced to such an extent that for FIG. 3, H+Z>M applies (see Diagram III′ in FIG. 3); and for FIG. 4, H+Z<M applies (see Diagram III″ in FIG. 4). The departure ΔM of the sum from M is respectively composed from an error ΔH and from an error ΔZ (see Diagrams III′ and III″ of FIGS. 3 and 4, respectively).

Figure 5:
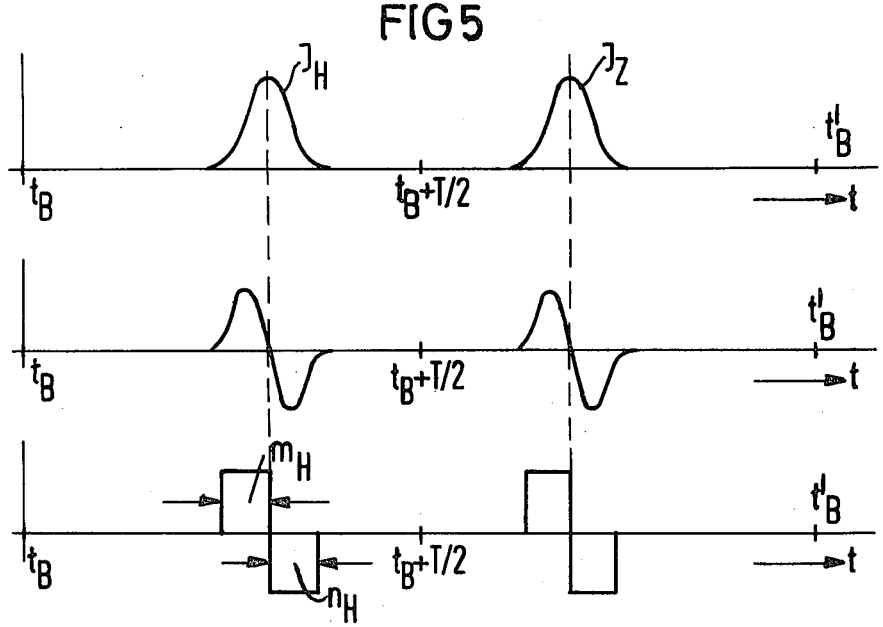
FIGS. 5 and 6 illustrate pulse diagrams V–VI and V'–VI' which respectively show the electric signals emitted by the detector of the apparatus via time t, differentiated signals derived therefrom, and differentiated signals deformed into square wave pulses, whereby it is assumed in FIG. 5 that the electrical signals are undistorted and in FIG. 6, that a distortion is assumed as apparent from FIG. 2.
Figure 6:
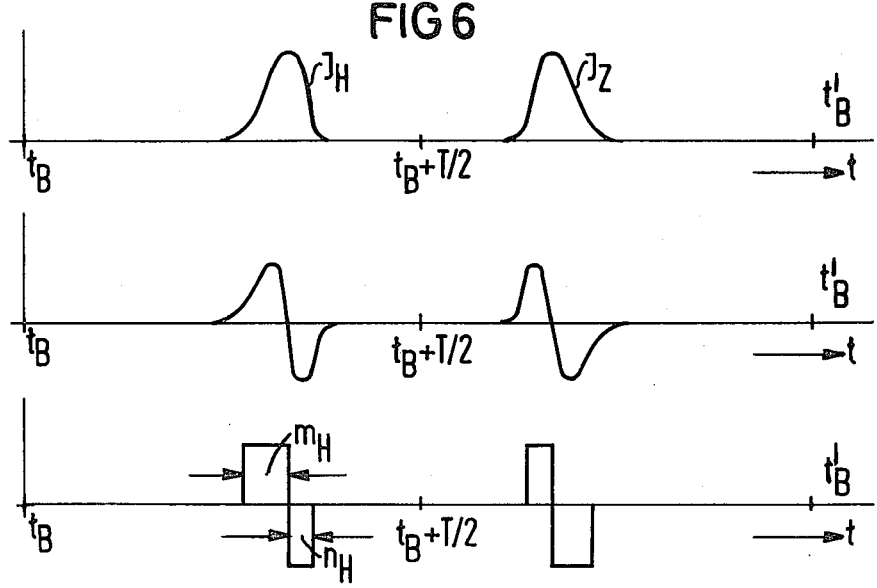

In order to ascertain the error ΔM brought about by the distortion of a bell-shaped pulse J$_H$ or J$_Z$, a bell-shaped pulse, for example the bell shaped pulse J$_H$, is differentiated. The pulse width m$_H$ and n$_H$ of the positive or negative pulse contained in the differentiated signal component are measured, and the correction signal is derived therefrom. In FIGS. 5 and 6, in diagrams IV, and IV′, respectively, symmetrical bell-shaped pulses or distorted bell-shaped pulses are illustrated. In diagrams V, and V′, differentiated signals derived therefrom are illustrated. The differentiated signals are converted into rectangular signals which are faithful to pulse width, and which are illustrated in diagrams VI and VI′, of FIGS. 3 and 4, respectively.

For the error ΔM, it is generally valid that it is quantitatively equal to the difference between the pulse width of the positive pulse and the pulse with of the negative pulse of the differentiated signal. This still applies even when an electrical signal from detector 61 exhibits several secondary lobes which are symmetrical to the center. In this case, the error ΔM is quantitatively given by the difference of the sum of the width of the negative pulses of the differentiated signal. The difference disappears in every instance if symmetry to a symmetry line S is provided.

The correction of the measuring error can be conducted electronically in the manner indicated above. In FIG. 7 a block circuit diagram of an electronic circuit for carrying out the method is illustrated. In this circuit, a signal J$_H$ emitted by the detector is supplied to a pulse shaper 71, a differentiating member 72, and a differentiating member 73. The pulse shaper 71 is designed such that it emits at one output the pulses illustrated in diagrams III, III′, and III″, to a digitizer 90 also having an input t$_B$ so as to create the sum M previously described. The light beam deflects outputs signals t$_B$ as a measure of the beam deflection time. How these pulses can be generated with the aid of a flip-flop circuit has already been described. The differentiating members 72 and 73 with differentiators 72a and 73a convert the differentiated signal by use of pulse shapers 72b and 73b into rectangular pulses which are faithful to pulse width, but with suppression of the positive pulse in member 72 and suppression of the negative pulse in member 73. The pulse lengths of the pulses from the pulse shaper 71, the negative pulse from the differentiating member 73 are digitized with the aid of a clock pulse generator 74 and digitizers 72c, 73c. This can occur in simple fashion such that the clock pulse generator signal, together with the corresponding pulse, are transmitted to a suitable terminal at whose output clock pulses appear as long as a pulse and a clock pulse are simultaneously connected to inputs. The pulse width and the interval of the clock pulses from one another must be small in comparison to the remaining pulses.

The digitized pulse widths are respectively counted by counters 75, 76, and 77. In counter 75, at the end of each count there is a number which corresponds to H+Z. In the counter 76 there is a number which corresponds to the pulse width n of the negative pulse or pulses. And in counter 77 there is a number which corresponds to the pulse width m of the positive pulse or pulses in the differentiating signal.

A comparator 78 compares whether n is smaller or greater than m. A subtractor 79, controlled by the comparator 78, executes the correct subtraction member between n and m, and at an output of the subtraction member, the error ΔM is emitted with the correct sign as a correction signal. An adder 80 adds the number ΔM to the number from the counter 75, and, at an output of this adder 80, the corrected measuring signal M appears.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for correcting a measuring signal generated by an apparatus which measures in contact-free fashion by scanning a surface to be measured with a light beam, and detecting light from the surface with an opto-electric detector, comprising the steps of: forming the measuring signal in dependence upon electrical signals emitted by the detector, determining a possible degree of a symmetrical shape distortion in at least one of the electrical signals from the detector, and correcting the measuring signal in dependence upon the determined degree of symmetrical shaped distortion.

2. A method according to claim 1 including the step of correcting the measuring signal with a separately generated correction signal dependent upon the distortion.

3. A method for correcting a measuring signal generated by an apparatus which measures in contact-free fashion by scanning a surface to be measured with a light beam, and detecting light from the surface with an opto-electric detector, comprising the steps of:

forming the measuring signal in dependence upon electrical signals emitted by the detector;

correcting the measuring signal in dependence upon a symmetrical shape distortion in at least one of the electrical signals from the detector; and determining the distortion of the electrical signal through differentiation and comparison of specific portions of the wave form of the differentiated signal.

4. A method according to claim 3, including the step of determining the distortion through comparison of a pulse width of the specific portions of the wave form.

5. A method according to claim 3 including the step of forming the correction signal in dependence upon a difference of pulse widths of two specific wave form portions of the differentiated signal.

6. A method according to claim 5 including the step of forming the measuring signal in dependence upon a chronological interval between two successive electrical signals from the detector, and to correct the measuring signal, a time difference of the chronological interval is corrected by adding a difference of said pulse widths to said time difference.

7. A method for correcting a measuring signal created by a light beam reflected from a surface whose distance is to be measured, the light beam reflection being received by a photodetector positioned to receive light only along a given sighting line directed at the object, said light beam from the light source being periodically deflected across the surface point intersected by the sight line, comprising the steps of: differentiating an electrical signal from the photo-detector in a first differentiating member and in a second differentiating member; creating a positive going pulse from a positive going portion of the differentiated wave form of the first differentiator and creating a negative going pulse based upon a negative going portion of a differentiated wave form from the second differentiator; comparing a time period of each of the two rectangular pulses formed in order to determine to what extent the electrical signal from the photo-detector is unsymmetrical relative to a peak value; and utilizing results of the comparison as a correction signal to be applied to correct the measuring signal of the apparatus.

8. A system for correcting a measuring signal generated by an apparatus which measures in contact-free fashion by scanning a surface to be measured with a light beam and detecting light reflected from the surface with an opto-electronic detector which provides electrical signals, comprising: first and second differentiators connected to receive the electrical signal; first and second respective pulse shapers for creating a respective positive going rectangular pulse from the first differentiator and a respective negative going rectangular pulse from the second differentiator; comparison means for comparing a time duration of the two rectangular pulses; and adder means for adding a result of the comparison to a measuring signal generated by the apparatus.

9. A system according to claim 8 wherein respective first and second digitizing means are connected to the first and second rectangular pulses, a digital output from the first and second digitizing means being fed to respective counter means whose outputs are connected to subtraction means for determining a difference error signal fed to the adder means.

10. A system according to claim 9 wherein a third pulse shaper receives the electrical signals from the photo-detector and feeds them to a third digitizer in turn connected with a third counter means for outputting the measuring signal to which the correction signal is added in the adder.

* * * * *